United States Patent [19]

Oury et al.

[11] Patent Number: 4,624,357
[45] Date of Patent: Nov. 25, 1986

[54] VEHICLE-MOUNTED EXTENSIBLE CONVEYOR

[75] Inventors: Robert F. Oury, Gilberts; Charles J. Arndt, Elk Grove Village, both of Ill.

[73] Assignee: Rotec Industries, Inc., Elmhurst, Ill.

[21] Appl. No.: 624,239

[22] Filed: Jun. 25, 1984

[51] Int. Cl.⁴ ............................................. B65G 41/00
[52] U.S. Cl. ................................... 198/313; 198/314; 198/317; 198/318
[58] Field of Search ............... 198/302, 313, 314, 315, 198/316, 317, 318, 583, 632, 316.1; 212/189; 280/765.1, 766.1, 47.13 R; 414/332, 505, 523, 919

[56] References Cited

U.S. PATENT DOCUMENTS

| | | | |
|---|---|---|---|
| 3,371,768 | 3/1968 | Oury et al. | 198/317 X |
| 3,512,669 | 5/1970 | Benedict et al. | 414/523 X |
| 3,598,224 | 8/1971 | Oury | 198/313 X |
| 3,613,866 | 10/1971 | Arndt | 198/313 X |
| 3,633,879 | 1/1972 | Prichard | 414/505 X |
| 3,638,805 | 2/1972 | Garnier | 212/189 |
| 3,825,107 | 7/1974 | Cary et al. | 198/313 |
| 3,945,484 | 3/1976 | Oury | 198/317 X |
| 3,985,036 | 10/1976 | Decker et al. | 212/189 X |
| 3,987,563 | 10/1976 | Baur | 212/189 X |
| 4,117,920 | 10/1978 | Oury | 198/302 X |
| 4,183,158 | 1/1980 | Satterwhite | 198/318 X |

FOREIGN PATENT DOCUMENTS

| | | | |
|---|---|---|---|
| 1172820 | 6/1964 | Fed. Rep. of Germany | 212/189 |
| 2322383 | 11/1974 | Fed. Rep. of Germany | |
| 3124029 | 3/1983 | Fed. Rep. of Germany | 212/189 |
| 38551 | 7/1965 | German Democratic Rep. | 198/314 |
| 57-58540 | 4/1982 | Japan | 280/765 |
| 153764 | 3/1956 | Sweden | |
| 2025878 | 7/1980 | United Kingdom | 198/313 |
| 2052419 | 7/1981 | United Kingdom | 198/313 |

Primary Examiner—Joseph E. Valenza
Assistant Examiner—Jonathan D. Holmes
Attorney, Agent, or Firm—Allegretti, Newitt, Witcoff & McAndrews, Ltd.

[57] ABSTRACT

An over-the-road vehicle having a pivotally-mounted telescoping boom which moves in and out, up and down, and from side to side. An extensible concrete conveyor belt is mounted on the boom for movement with the boom for conveying and placing concrete within the reach of the boom. The vehicle is equipped with stabilizing outriggers which are pivotally mounted on the vehicle and can be folded back in nesting relation to minimize the width of the vehicle during transit. The vehicle also carries a separate belt conveyor for feeding concrete to the extensible conveyor, the discharge end of said separate conveyor being mounted on arms which fold down to reduce the overall height of the vehicle during transit.

6 Claims, 15 Drawing Figures

VEHICLE-MOUNTED EXTENSIBLE CONVEYOR

BACKGROUND

This invention relates to a self-propelled conveyor means for concrete and the like which can be driven to a job site, used to place concrete continuously in forms of varying height and length, and then folded up for over-the-highway travel to the next job site. More particularly, the apparatus comprises the combination of a belt conveyor mounted on a telescoping boom, a feed conveyor, and outrigger members, all of which can be mounted on a conventional truck, these parts being constructed to permit rapid conversion from the operating to the transfer mode.

PRIOR ART

Mobile conveyors on telescoping booms of the type shown in U.S. Pat. No. 3,598,224 have been in use for some time. Mobile conveyors of this kind have been found to be very useful because the concrete, or other material being transported by the conveyor, can be placed exactly where the operator desires. Not only can the entire conveyor be moved by moving the vehicle on which it is mounted, but the boom which carries the conveyor can be extended and retracted, pivoted about a vertical axis, and elevated to considerable heights. The extensible concrete placing conveyor is fed by a second conveyor, having one end on the ground for receiving concrete from a ready-mix truck or other delivery means (conveyor, crane and bucket, etc.)

While it is possible to move an apparatus of this kind around the job site, it is not possible to transport it over highways to go from one job site to another. The reason for this is that the bulk of the apparatus exceeds the dimensional limits imposed by state laws for over-the-highway travel.

THE INVENTION

One of the objects of this invention is to provide a mobile conveyor of the kind indicated which can be transported from one job site to another on the vehicle without exceeding the legal dimensional limits for over-the-highway travel. Another object is to provide outriggers for stabilizing the vehicle while the conveyor is being operated, and which fold together into a package which is less than eight feet wide. Another object is to provide a feed conveyor having one end elevated above and connected to the placement conveyor for carrying concrete to the placement conveyor, the elevated end being capable of folding down to within the maximum height dimension for highway travel. Another object is to provide a conveyor assembly which can be easily removed, together with the outriggers, as a unit from the supporting truck so that the truck can be used for other purposes.

In a preferred form of the invention, a telescoping boom carrying an extensible belt conveyor is mounted, cantilever fashion, on a turntable on the vehicle, two pairs of outriggers are rotatably secured at their inner ends to the vehicle beneath the turntable, the first pair of outriggers being foldable to nest inside the second pair of outriggers behind the truck for highway travel.

THE DRAWINGS

The apparatus for carrying out the objectives of the invention is set forth in further detail in the following description when read in conjunction with the drawings, in which FIG. 1 is a perspective view of the concrete conveyor means showing the various elements in place for placing concrete into a form for a dam or the like;

DETAILED DESCRIPTION

Figure 1:
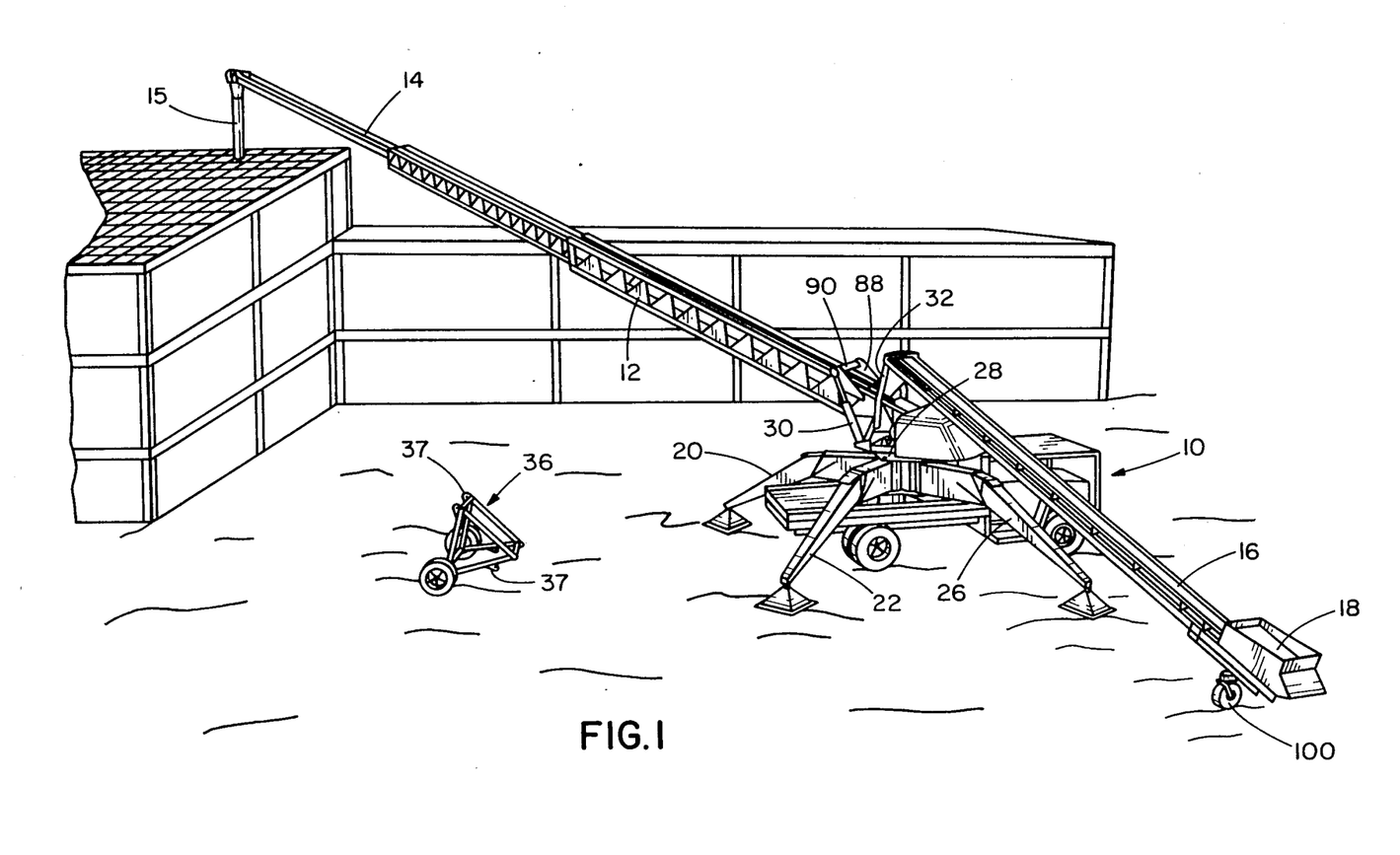

Referring to FIG. 1, the vehicle 10 is a conventional truck with a dump body which has been modified to detachably carry, as a unit, the outriggers 20,22,24,26, the telescoping boom 12, carrying the extensible concrete placing conveyor belt 14, a tremie 15, and the feed conveyor 16. The boom is mounted cantilever fashion on a turntable secured to the truck. Feed conveyor 16 has a caster 100 supporting the lower end thereof on the ground which permits rotating that end completely around the truck. The elevated end of conveyor 16 is rotatably supported by a yoke 32 which is pivotally mounted on the upright members of turntable 28. A hopper 18 receives concrete from a ready-mix truck and directs it onto the belt of conveyor 16. The outriggers are pivotally mounted on a support pedestal beneath the turntable. Outriggers 24,26 are mounted forwardly and outwardly of the outriggers 20,22. This permits outriggers 24,26 to be folded back around the outriggers 20,22 without interference. A detachable dolly 36 serves to support the outer end of the retracted boom 12 when the apparatus is rigged for highway travel, as shown in FIG. 2.

Figure 2:
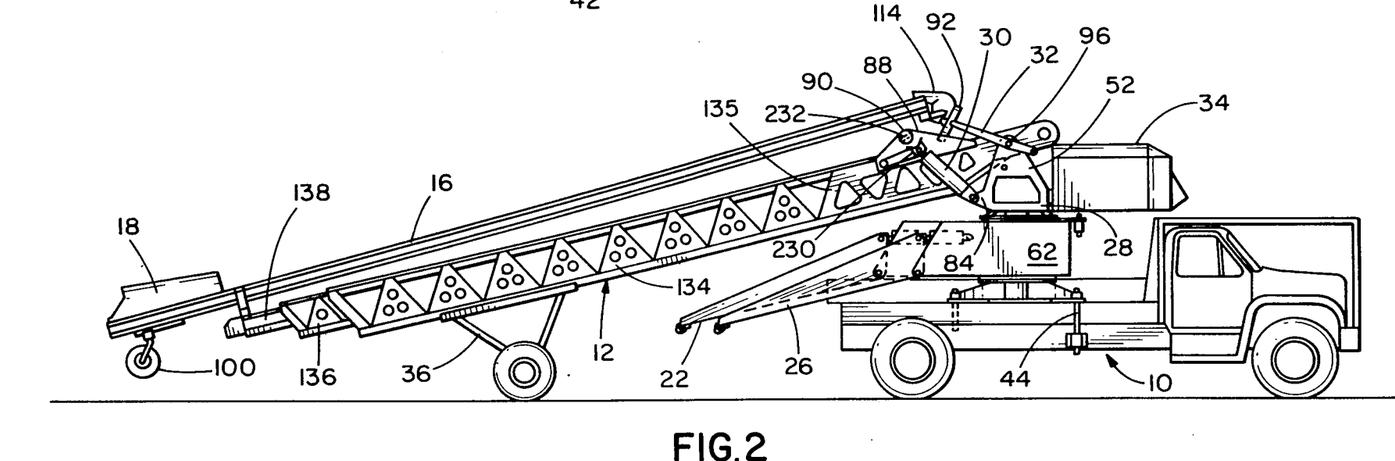
FIG. 2 is a side elevation of the vehicle ready for highway travel with the placement conveyor and the feed conveyor in trailing position and the outriggers nested.
Figure 3:
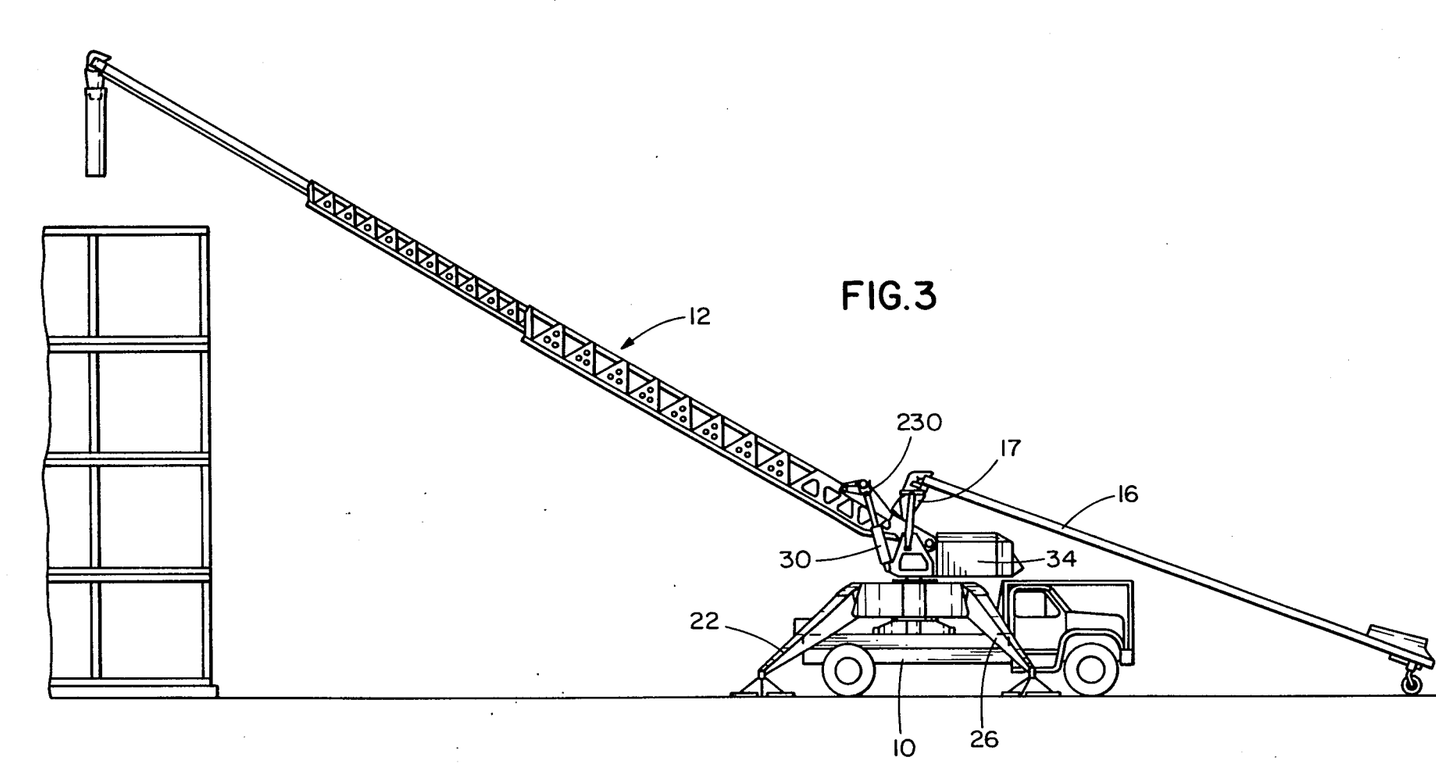
FIG. 3 is a side elevation of the conveyor means in operating position.
Figure 4:
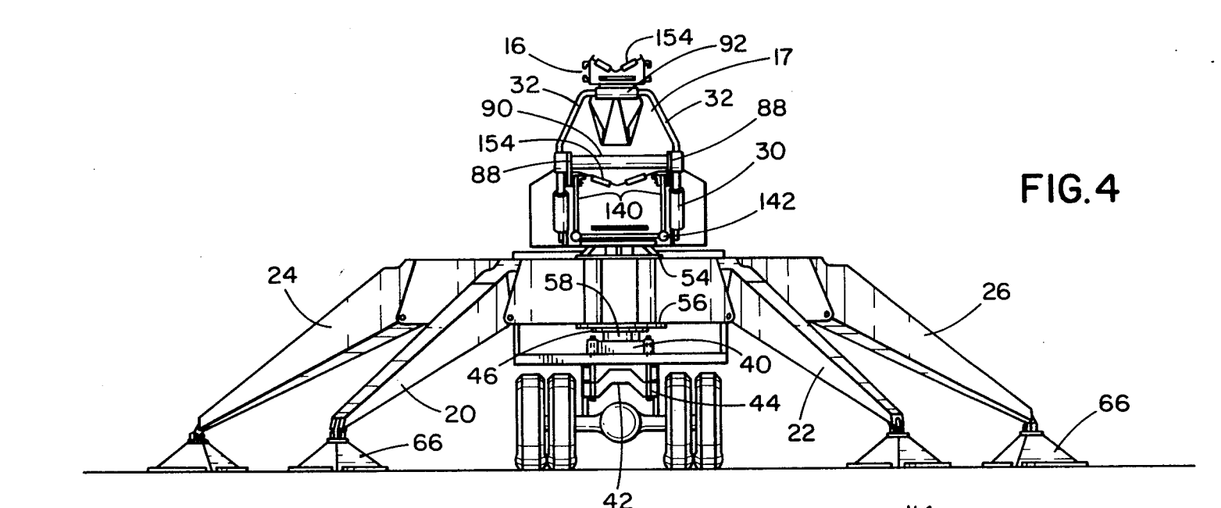
FIG. 4 is a rear elevational view of the vehicle, the outriggers in operating position, the turntable, and the rotatable support for the feed conveyor.
Figure 5:
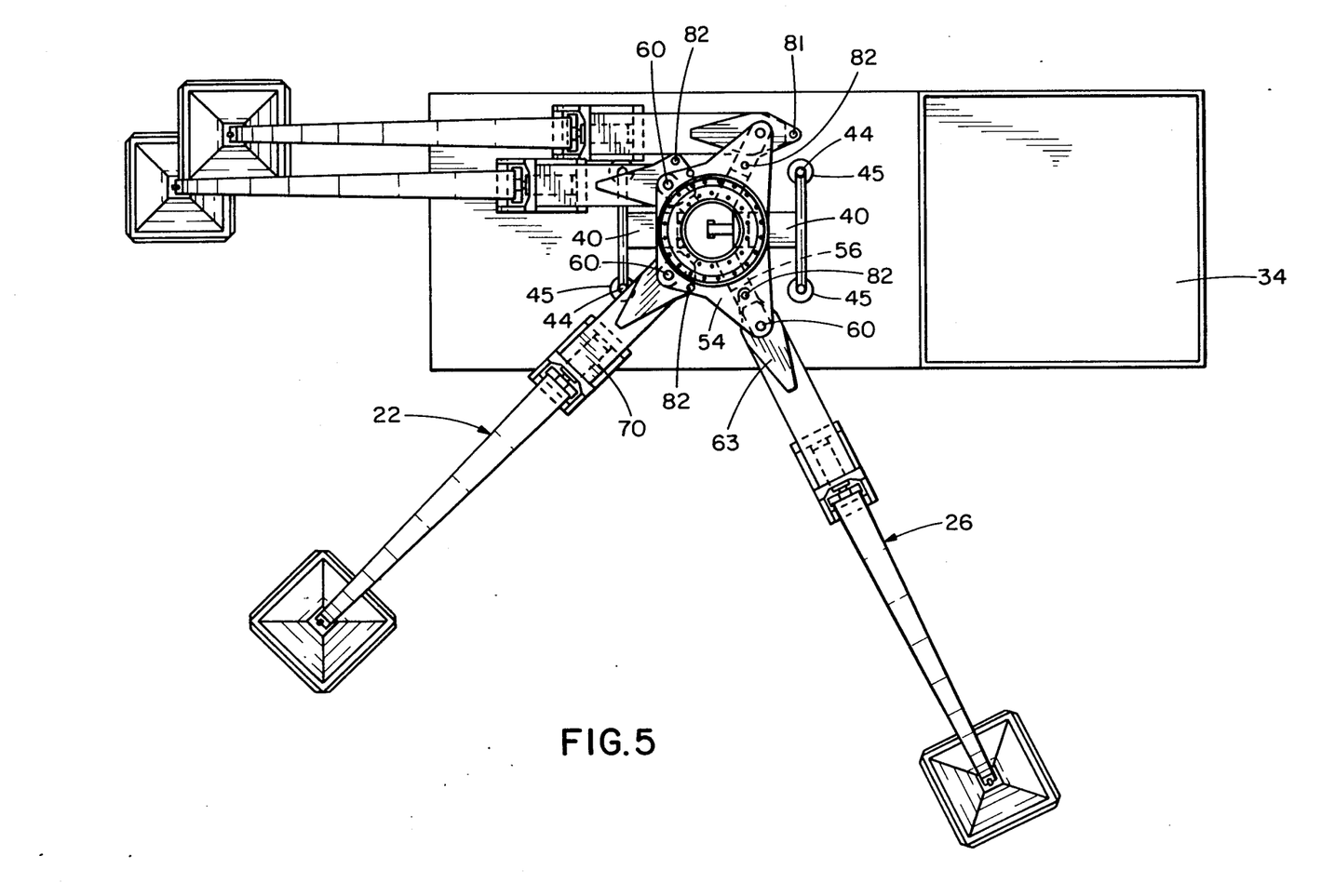
FIG. 5 is a plan view of the turntable and the outriggers mounted on the truck bed, two of the outriggers being extended and two being nested.

Referring to FIGS. 2, 4 and 5, a pedestal 40, having four supporting feet 45, is mounted on the truck bed and secured by four long bolts 44 to forward and aft cross beams 42, secured to truck frame channels which are suitably reinforced. The pedestal has a central hub 58 which supports the turntable base 46 bolted to the hub. The turntable base consists of a top plate 54 and a bottom plate 56 which are joined together by the hub member 58. Both the top plate 54 and the bottom plate 56 have congruent wings extending forwardly and outwardly from the central hub (FIG. 5), the wings having vertically-aligned bearings at the outer ends thereof to support arbors 60 to which the outriggers 24,26 are pivotally secured. Plates 54,56 also contain a second set of bearings inwardly and rearwardly of the first set which carry arbors 60 for rotatably connecting the outriggers 20,22.

Figure 6:
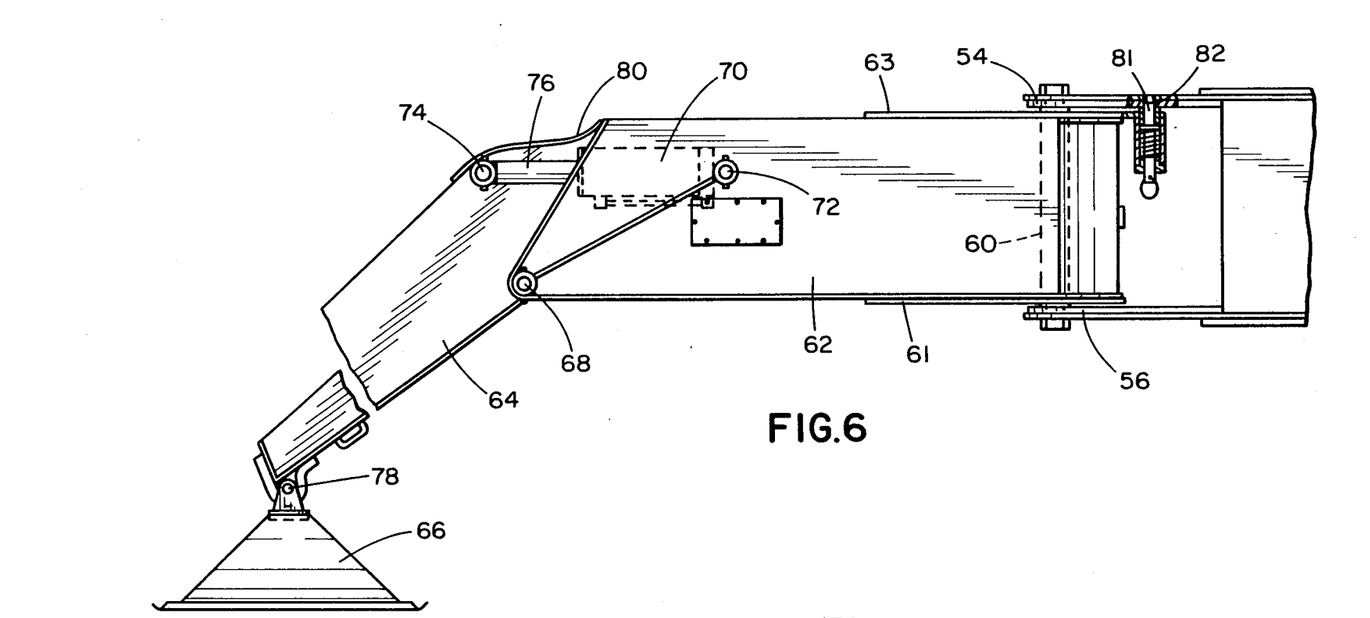
FIG. 6 is a side elevation view of one outrigger showing the articulated beam, leg and foot.
Figure 15:
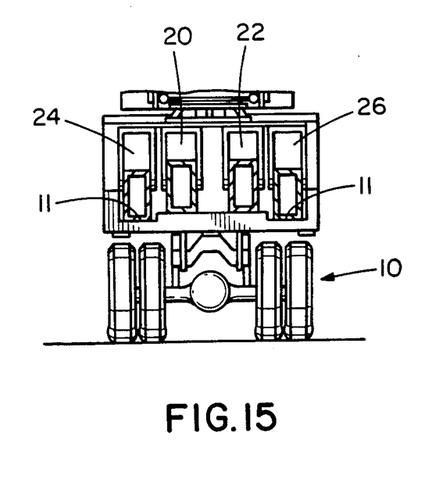
FIG. 15 is a rear elevational view of the truck body showing the outriggers fitted into the tailgate.

Each of the outriggers is constructed in the same manner. Only one will be described in detail. Referring to FIG. 6, a horizontal beam 62, constituting the first segment of the outrigger, is pivotally connected to the plates 54,56 by means of the arbors 60. The leg portion 64 of the outrigger is pivoted to the end of the beam at 68. A flexible cover 80 protects the hydraulic cylinder from spilled concrete or foreign materials that might fall onto the joint between beam 62 and leg 64. Removably connected to the end of the leg 64 is a foot 66 which freely pivots about pin 78. A hydraulic cylinder 70 is at one end, pivotally connected to pin 72, secured to the beam 62, and, at the other end, has a piston rod 76 which is pivotally connected to the pivot pin 74, affixed to the leg 64. As the piston rod 76 is retracted, the leg 64 is lifted to an elevated position above the ground. A V-shaped plate 63 is welded to the top of the beam 62, the inner end of which has an opening 82 (FIG. 6) which is aligned with a similar opening in the plate 54 when the outrigger is in operating position. A removable pin 81 is placed through the aligned openings to prevent rotation of the outrigger during operation. If desired, the pin 81 may be spring-loaded to closed position and connected by a cable (not shown) to the operator's platform to permit pulling the pin against the force of the spring to permit rotation. To lock them in place, the retracted outriggers fit into depressions or cut outs 11 in the tailgate of the truck body, as shown in FIG. 15.

Figure 14:
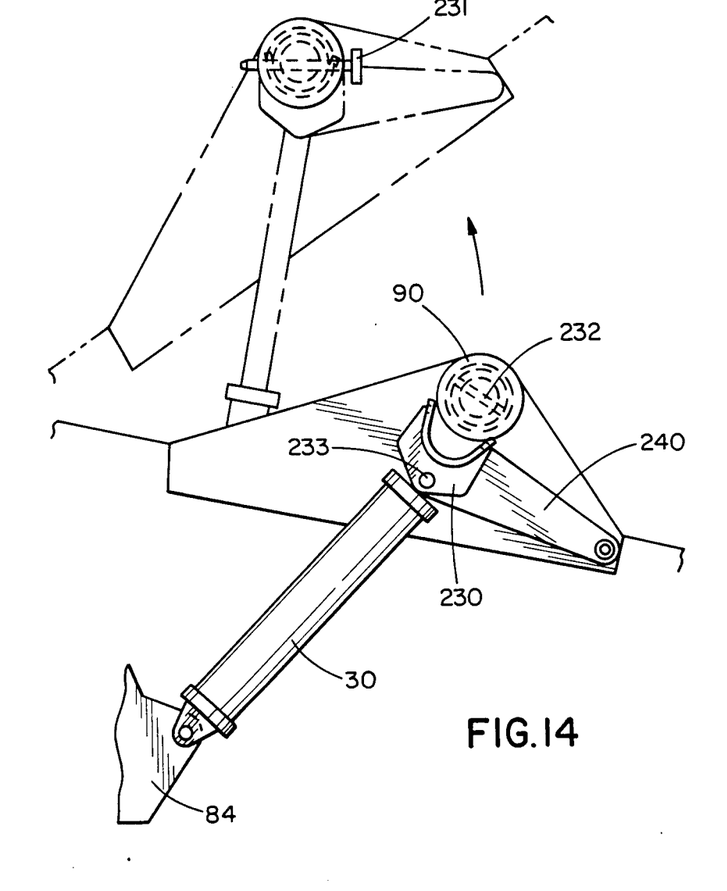
FIG. 14 is an enlarged view of the lifting mechanism for the boom and integral conveyor, disengaged and, in broken lines, engaged.

A turntable 28 is rotatably mounted on ring gear 120 (FIG. 9) supported by the turntable base 46. As shown in FIG. 2, the turntable 28, in addition to the circular base, consists of a frame member which extends outwardly from the circular base to support a fuel tank, a hydraulic fluid tank, and a diesel engine for pressurizing the hydraulic fluid, indicated at 34. Integral with the turntable on either side of the round base are a pair of sturdy triangular upright supports 52 which contain bearings in their apices to support the horizontal shaft 97 (FIG. 13) about which the boom member 12 pivots up and down. Secured to the top edge of base section 134 outwardly from the boom support shaft 97, are a pair of connector plates 88, having openings for receiving the rod 90. The base section 134 is reinforced at 135 to take the load imposed on the connector plates. Rod 90 forms a yoke with a pair of hydraulic cylinders 30 (FIGS. 1 and 14). The lower ends of the cylinders 30 are pivotally connected to ears 84, integral with the upright members 52 of the turntable 28 (FIG. 2). When the hydraulic cylinders 30 are extended, (broken lines, FIG. 14), the outer end of the boom, with the conveyors, is raised as the boom pivots about shaft 97.

The outer ends of the piston rods of the cylinders 30 take the form of saddles 230 pivotable about pin 233, and embrace the opposed rounded surface of the rod 90, as best shown in FIG. 14. The saddles pivot on arm 240 and, in operative position, are detachably connected to the rod 90 with pins 231 extending across the diameter of the rod and through the saddle. During transport, the pins are pulled, which permits the piston rods to be retracted, thus putting the boom in "float" position (solid lines, FIG. 14).

Figures 11, 13:
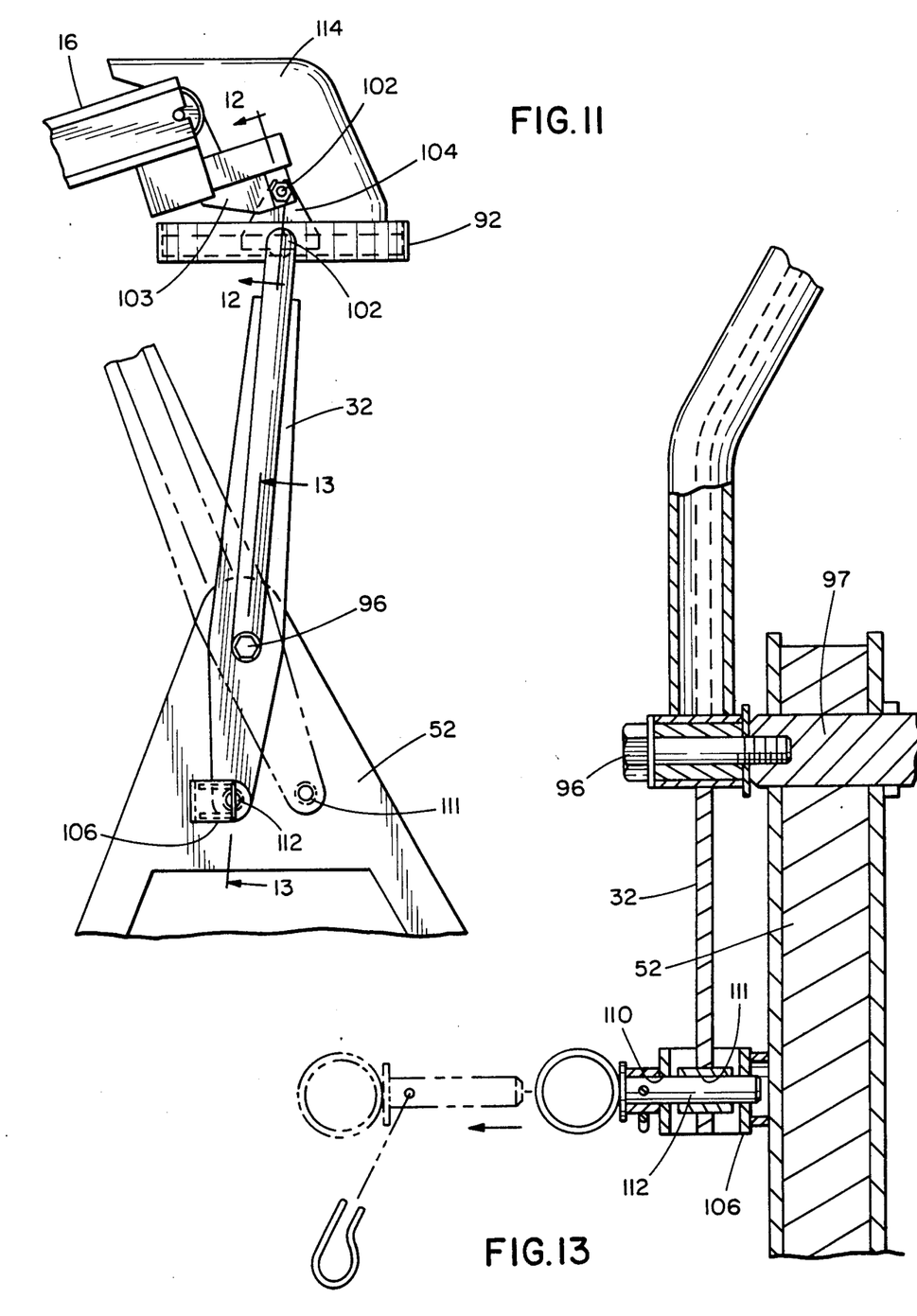
FIG. 11 is a side elevational view of the retractable yoke support for the supply conveyor and the end of the supply conveyor connected thereto.
FIG. 13 is a sectional view taken along the line 13—13 of FIG. 11 showing the locking mechanism for the yoke support.
Figure 12:
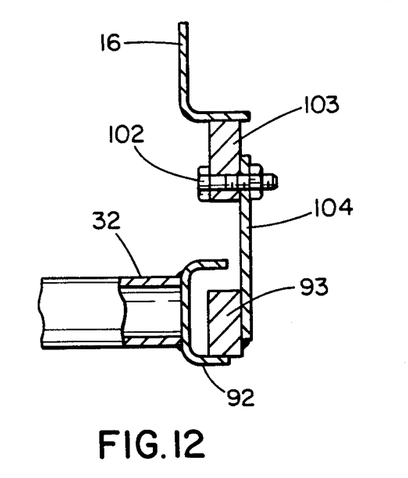
FIG. 12 is a sectional view taken along the line 12—12 of FIG. 11.

Extensible concrete-placing belt conveyors are mounted on the boom 12 and are fed by the feed conveyor 16. The upper end of the feed conveyor has a pair of arms 32 which connect to ears 104, welded to a ring 92 via block 93 (FIGS. 11, 12 and 13). The arms 32, with the ring, form a yoke which is pivotally connected to upright members 52 of the turntable by means of bolts 96, which screw into the end of shaft 97, which carries the boom. This is best shown in FIG. 13. Brackets 103, depending from the frame of conveyor 16, are swivelly connected to ears 104 by pins 102. The structure shown in FIGS. 11, 12 and 13 is duplicated on the other side of the conveyor. To lock the ring 92 and the upper end of the feed conveyor 16 connected thereto in elevated position, as shown in FIGS. 11 and 13, an opening 111 is provided in the lower end of the arm 32. A pin 112 slides through opening 111 and aligned openings 110 in a U-shaped bracket 106 welded to upright 52.

When it is desired to lower the upper end of the feed conveyor to traveling position, the pins 112 on both legs of the yoke are removed. The yoke can then pivot rearwardly, as shown in broken lines in FIG. 11, to bring the upper end of conveyor 16 into retracted position (FIG. 2).

A discharge boot 114 is connected to the end of the feed conveyor 16. Concrete discharged from the end of this conveyor strikes the boot and falls through the ring 92 down chute 17 onto the belt of the placing conveyor.

Figure 9:
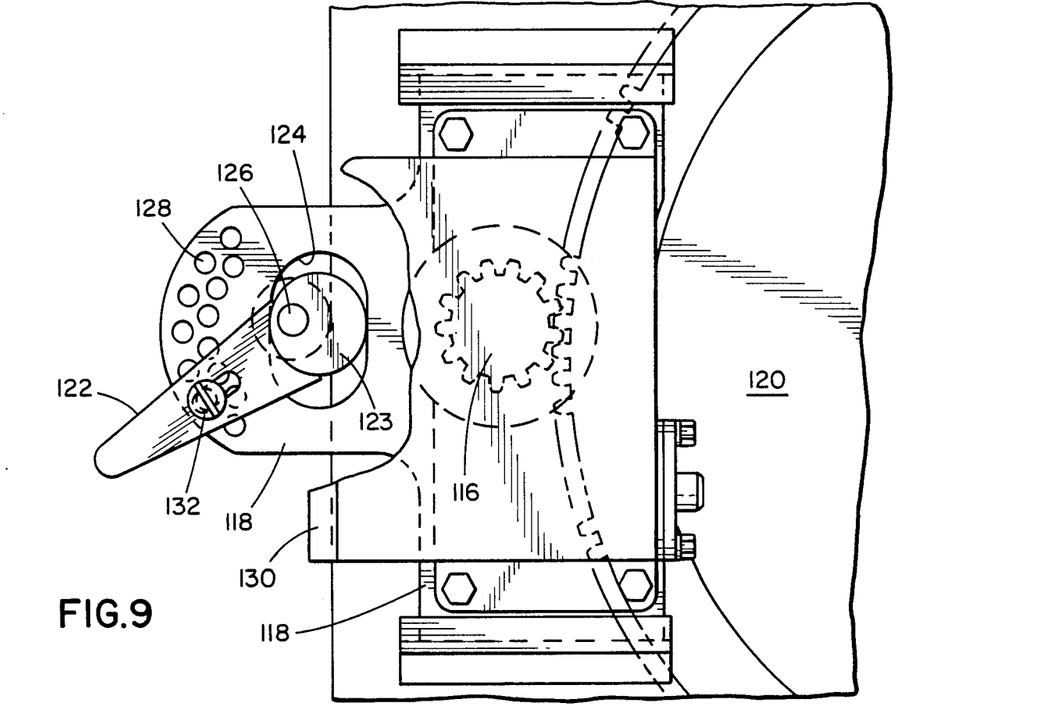
FIG. 9 is a plan view of the drive means for the turntable showing the ring gear of the turntable meshing with the drive pinion.
Figure 10:
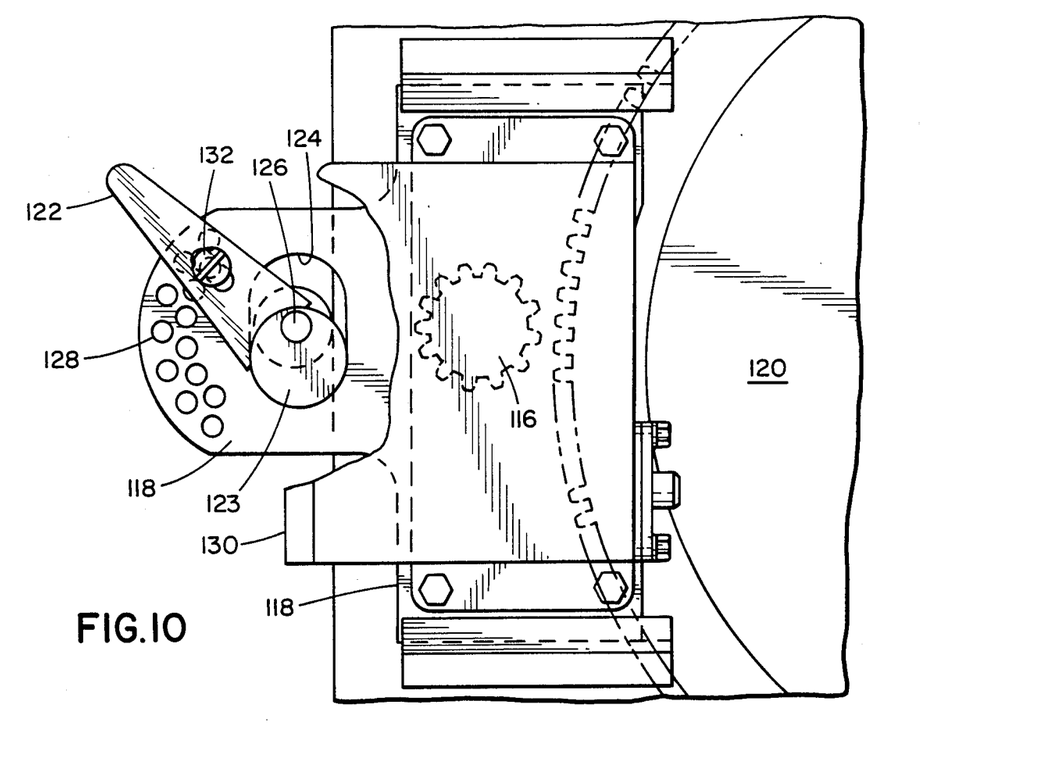
FIG. 10 is a view similar to FIG. 9 showing the pinion out of engagement with the ring gear.

Referring to FIGS. 9 and 10, the ring gear 120, which is disposed between the turntable 28 and the turntable base 46, serves to rotate the turntable, and with it, the boom mounted on the turntable. A pinion 116, driven by an hydraulic motor (not shown) through a gear reducer 130, is mounted on a sliding plate 118. A crank 122, having a circular boss 123 which fits into a slot 124 in a plate 118, is eccentrically mounted on fixed pin 126. As the crank rotates about the pin 126, the plate 118, and with it pinion 116, moves toward or away from the ring gear 120, depending upon the direction of rotation. A plurality of spaced holes 128, together with a cooperating pin 132, serve to lock the crank in the desired position. As the crank is turned from the position shown in FIG. 9 to that shown in FIG. 10, the boss 123 moves laterally in the slot 124 to slide the pinion 116 out of engagement with the ring gear. This permits the boom to swing freely on the turntable during travel mode.

The telescoping boom on which the extensible conveyors are mounted have three sections, a base section 134, an intermediate section 136, and a head section 138, as best shown in FIG. 2. Each of the telescoping members of the boom is constructed in essentially the same manner. As mentioned, the inner end of the base section is reinforced by a pair of strengthening plates 135, to which the connector plates 88 are secured. This structure must be sufficiently rigid to lift the telescoping boom, including the conveyors carried on the boom, and heavy concrete carried on the conveyors. The hydraulic cylinders 30 connect to the boom a relatively short distance ahead of the pivot shaft 97, so the mechanical advantage for lifting a heavy extended boom with conveyors is relatively small.

Figure 7:
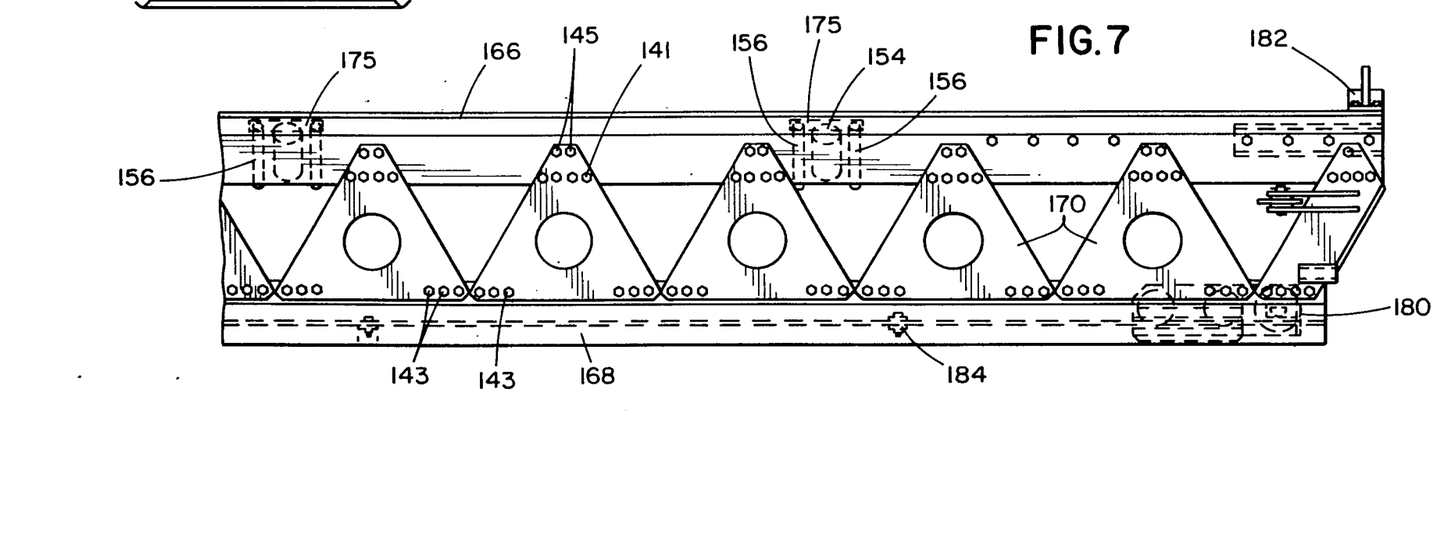
FIG. 7 is a side elevation view of the intermediate section of the telescoping boom which supports the intermediate section of the extensible belt conveyor.
Figure 8:
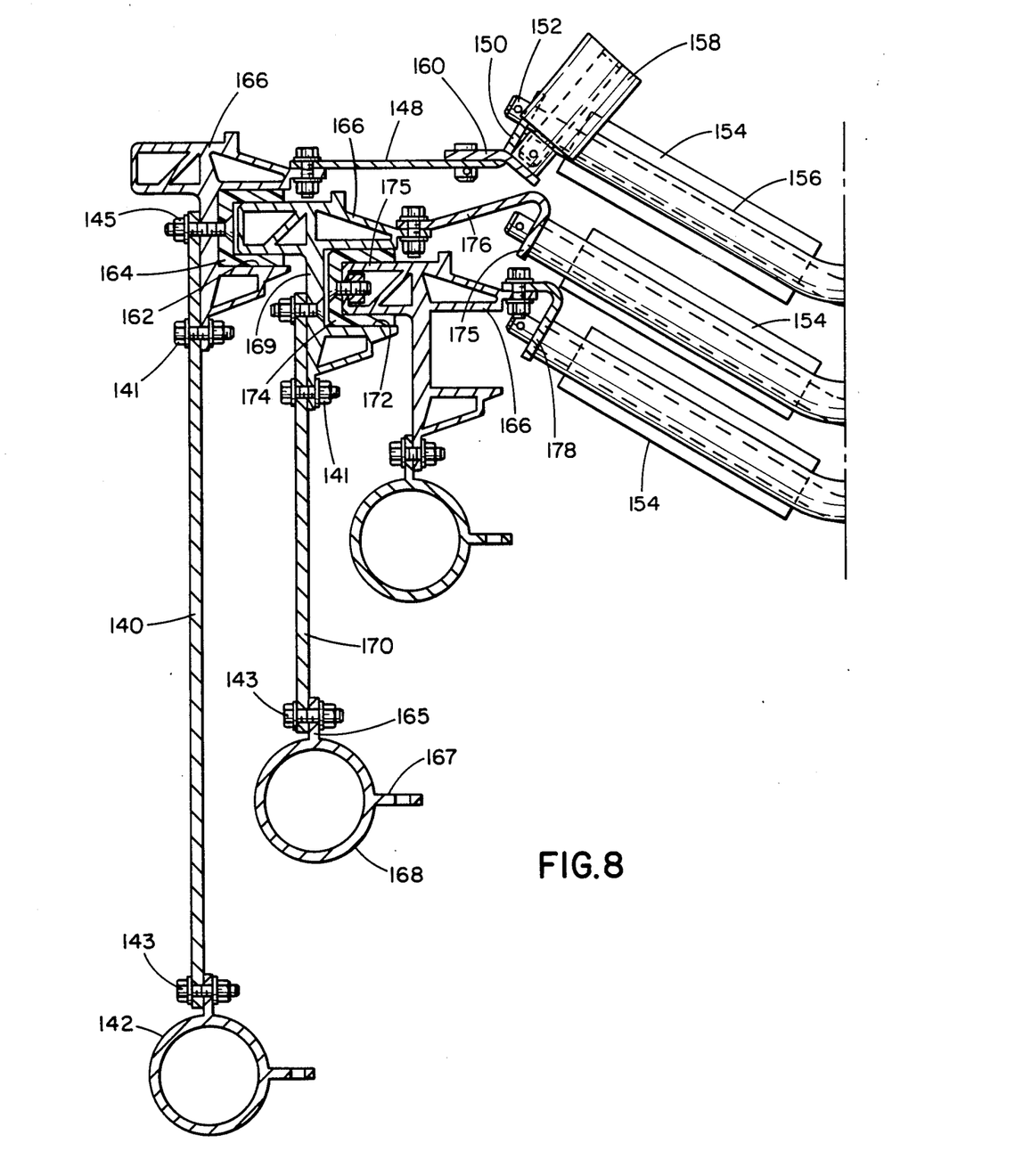
FIG. 8 is a sectional transverse view through half of the telescoping boom showing the three telescoping sections and accompanying belt conveyor supports.

FIGS. 7 and 8 show a portion of the intermediate boom and a cross-section through all three boom sections and their conveyor mountings. Although there are two truss members running the length of the boom, one on either side of the conveyor, only one will be described, since the other is the mirror image of the one. In FIG. 8, only half of the structure is shown, that which is to the left of the centerline of the conveyor. The intermediate truss structure, shown in FIGS. 7 and 8, has a lower tubular extrusion 168, having a flange 167, and another flange 165, at 90° thereto. The second extrusion 166, forming the upper rail of the truss structure, is secured to the lower rail 168 by means of struts in the form of triangular plates 170 which are bolted at their bases to the flange 165 and to the vertical member 169 of the upper extrusion rail. The bolts are indicated at 141,143,145 in FIG. 7. In case of damage, the triangular plates 170 may be readily replaced. The upper extrusion includes a longitudinal way 172 which is lined with a layer of high molecular weight polyethylene, or similar slippery material, in which rib 175 projecting from the adjoining truss member 166 can slide. A bracket 176 is bolted to the extrusion 166 for supporting a central shaft carrying the idler roll 154 and a pair of rods 156 which serve to connect together the two truss members forming the intermediate boom. The conveyor belt which carries the concrete (not shown), rides on the idler rolls 154 which, will be noted, are canted so that the flexible belt is turned up along its marginal edges. This structure is well-known in the art.

The hollow interiors of the extrusions 168 and 166 serve to carry electrical and hydraulic wires and tubes. From FIG. 8 it will be apparent that the truss member for the base section 134 is of similar construction to that just described, except that the triangular strut members indicated at 140 are larger than those for the intermediate boom section. As indicated, the upper extrusion 166 has a box-like projection, or rib, along its length which fits into the way 162. Thus, the base section supports the intermediate section and, in the same manner, the intermediate section in turn supports the head section of the boom in sliding relation. Cables and pulleys mounted on the boom sections and powered by hydraulic motors serve to extend and retract the boom sections and the conveyors mounted thereon. These parts are not shown on the drawings. The upper and lower extrusions are identical in each section. Rods 184 (FIG. 7) connect to the flanges 167 to join the opposed truss members at the bottom. A pulley 180, over which the flexible belt is trained, is mounted in bearings, one on either side of the boom connected to the extrusion 168. The pulley is adjustable to permit adjusting tension in the belt. A single endless belt is trained over the pulleys of all three boom sections, and is adapted to remain taut as the sections move in and out. A drive pulley, not shown, is mounted on the boom to drive the belt.

Flow of hydraulic fluid to the hydraulic motors, the hydraulic cylinders and the like, is controlled by valves through a hand-held remote control panel. Thus, the operator may stand anywhere within about 80 feet of the engine/hydraulic system 34 and perform the following operations: cause the boom to swing to the right or to the left, extend or retract the conveyor, raise or lower the boom, start or stop the conveyor belt, and control the speed of the belt. Hydraulic controls of this kind are well-known in the art and need not be described. With this apparatus it will be apparent that concrete fed to hopper 18 can be placed precisely where desired by moving the boom 12 in any of three directions intermittently or continuously.

When it is desired to move the concrete placing apparatus to another site, the various parts of the apparatus can be packed up in accordance with the following procedure. The feed conveyor is positioned over the boom 12 and secured thereto at its lower end. The pins 112 are removed from the lower ends of the yoke arms 32 to permit the yoke to swing downwardly. The boom 12 is extended until the ring 92 rests on the conveyor belt on boom section 134. This reduces the overall height of the apparatus, as shown in FIG. 2, so that it will pass under bridges and so forth over a highway. The boom 12 is then elevated to the point where the towing dolly 36 can be placed beneath the truss structure of boom section 134 and secured thereto. Next, the swing drive for the turntable is disengaged by moving the crank 122 so that the pinion 116 is in the position shown in FIG. 10. This permits the entire conveyor device to pivot freely on the turntable as the truck turns, just like a trailer.

Next, each of the four outriggers is raised, the locking pins 81 are removed, and the legs are swung rewardly so that they nest together with the legs 24,26 outside the legs 20,22. The outriggers are lowered into slots 11 cut in the tailgate of the truck body which supports them and prevents them from swinging outwardly. To prevent interference between the feet 66 when the outriggers are in traveling position, one or more of the feet may be removed and stored in the extra space provided on the underside of one of the outrigger legs. The cylinders 30 are disconnected from the rod 90 by removing the pins 231 connecting the rods to saddles 230. This puts the boom 12 in float position.

The truck can then be used on the highway to tow the conveyors without exceeding any of the legal limitations imposed on the size of highway loads.

We claim:
1. A self-propelled conveyor means for concrete and the like which can be compactly nested for highway travel, comprising, in combination:
   a vehicle having a front and rear, said rear including two outermost power wheels, said power wheels defining a predetermined side-to-side width of said vehicle,
   a turntable mounted on said vehicle,
   an extensible boom for rotation on said truntable,
   an extensible conveyor supported by said boom,
   yoke means for pivotally mounting said extensible boom cantilever fashion on said turntable, said yoke extending above said turntable, so the boom may be elevated and rotated toward the rear of the vehicle when the vehicle is in transit,
   a hydraulic cylinder disposed between said yoke and said boom to elevate and lower the boom,
   removable pins for securing said cylinders to said yoke, whereby the cylinder may be disconnected so the free end of said boom may freely move up and down when the vehicle is in transit,
   two pairs of outriggers mounted for rotation at their inner ends on vertically disposed arbors fixed to the vehicle beneath said turntable and outside the circumference of said turntable,
   the first pair of said arbors disposed rearwardly of said turntable and symmetrically with respect to the forward-rearward centerline of said turntable, the second pair of said arbors disposed forwardly of said turntable radially outside said first pair and symmetrically with respect to the forward-rearward centerline of said turntable, said outriggers nesting rearwardly and defining a side-to-side width less than said predetermined side-to-side width of said vehicle, wheel means for supporting the free end of the boom while the vehicle is in transit, a pair of arms pivotally mounted on said yoke, said arms extending above said yoke, and a feed conveyor having receiving and discharge ends, said discharge end pivotally secured to said arms, whereby, during transit, said outriggers can be folded back, toward the rear of the vehicle, with one pair nested inside the other, said boom can be disposed over said folded outriggers with said wheel means on the ground, and said feed conveyor can be disposed over said boom, said outriggers, boom, and feed conveyor all substantially completely lying within said side-to-side width of said vehicle.

2. The conveyor means of claim 1 further comprising removable means for locking said arms in upright position and lowering said arms when the vehicle is in transit.

3. The conveyor means of claim 2 further comprising drive means for said turntable.

4. The conveyor means of claim 3 further comprising means for disconnecting the drive means so the boom may freely rotate when the vehicle is in transit.

5. The conveyor means of claim 3 in which said boom comprises a truss having beam members connected together with triangular strut plates detachably secured to said beam members to facilitate plate replacement.

6. The conveyor means of claim 5 further including a hopper on said receiving end of said feed conveyor for directing concrete toward said feed conveyor.

* * * * *